United States Patent
Tada et al.

[11] Patent Number: 6,078,442
[45] Date of Patent: Jun. 20, 2000

[54] ND FILTER

[75] Inventors: Eijiroh Tada; Masakazu Yamagata; Shunichiro Wakamiya, all of Saitama; Masayuki Arai; Toru Shikano, both of Tokyo; Takayasu Shishido, Saitama, all of Japan

[73] Assignee: Asahi Seimitsu Kabushiki Kaisha, Tokyo, Japan

[21] Appl. No.: 09/064,095

[22] Filed: Apr. 22, 1998

[30] Foreign Application Priority Data

| Jun. 27, 1997 | [JP] | Japan | 9-172177 |
| Jul. 4, 1997 | [JP] | Japan | 9-179515 |
| Jul. 28, 1997 | [JP] | Japan | 9-201904 |
| Jul. 28, 1997 | [JP] | Japan | 9-201905 |
| Oct. 3, 1997 | [JP] | Japan | 9-271610 |

[51] Int. Cl.⁷ ................................................. G02B 5/22
[52] U.S. Cl. ........................ 359/890; 359/885; 359/888
[58] Field of Search ..................... 359/885, 887, 359/888, 890; 355/71

[56] References Cited

U.S. PATENT DOCUMENTS

| 3,981,565 | 9/1976 | Karasawa | 359/888 |
| 4,298,275 | 11/1981 | Chitchlow et al. | 359/888 |
| 4,922,280 | 5/1990 | Koshino et al. | |
| 5,111,343 | 5/1992 | Harrigan | 359/888 |

Primary Examiner—Cassandra Spyrou
Assistant Examiner—Darren E. Schuberg
Attorney, Agent, or Firm—Greenblum & Bernstein P.L.C.

[57] ABSTRACT

In a concentric ND filter in which multi-layered circular ND filter elements whose diameter is decreased stepwise toward the uppermost layer from the lowermost layer are concentrically provided on a first transparent substrate, a surrounding space of the concentrically multi-layered ND filter elements defined by and between the surface of the transparent substrate and the surface of the central ND filter layer of the smallest diameter is filled with a transparent adhesive.

14 Claims, 13 Drawing Sheets

ND FILTER

BACKGROUND OF THE INVENTION

1. Field of the Invention

The present invention relates to an ND filter whose transmittance is reduced more in the central portion than in the peripheral portion.

2. Description of the Related Art

For instance, in a lens for a CCTV, a concentric ND filter having concentric filter elements is used to obtain an apparent F-number larger than the maximum F-number which is determined by the minimum size of the mechanical diaphragm aperture by reducing the quantity of light passing through the filter. FIG. 22 shows a conceptual view of a concentric ND filter, in which a plurality of multi-layered circular ND filter elements (light absorbing layers) 12, 13, 14 whose diameters are reduced stepwise in this order are formed in a concentrical arrangement on a transparent substrate 11 by an evaporation process. In general, the thickness of the transparent substrate 11 is approximately 0.5 mm and the thickness of each circular filter layer 12, 13 or 14 is in the order of a few tenths of a micrometer. In the concentric ND filter 10 shown in FIG. 22, since the quantity of light passing therethrough decreases as the mechanical diaphragm (stop) becomes smaller, a large apparent F-number can be obtained.

However, it has been found in a lens having the concentric ND filter 10 that a slight focus shift occurs between in a fully-open position of the mechanical stop and in the minimum stop position, thus leading to a deterioration of the image quality.

SUMMARY OF THE INVENTION

It is an object of the present invention to provide an ND filter in which there is no focus shift between at a fully-open position of the mechanical stop and at the maximum closure of the aperture, thus resulting in no deterioration of the image quality.

The inventors of the present invention have hypothesized that the focus shift at the full-open aperture or the smallest aperture is caused by the following reasons. Namely, although each of the concentrically multi-layered circular ND filter elements, whose refractive indexes are in the range of approximately 1.3 to 2.9, has a thickness in the order of a few tenths of a micrometer, there is a difference in the layer thickness of the entire ND filter between the central portion and the peripheral portion, and hence the difference in the layer thickness invites a difference in the optical path length reduced to a spatial length, so that the difference in the optical path length produces a kind of convex lens effect. According to this hypothesis, attempts have been made to provide a transparent adhesive whose refractive index is identical or substantially identical to that of the ND filter layers in the circumferential space of the circular ND filter layers, i.e., on the microscopic stepped portions between the circular ND filter layers of different diameters or between the substrate and the lowermost ND filter layer to thereby eliminate the difference in the optical light path. Consequently, the focus shift has been restricted. Namely, it can be considered that in the conventional concentric ND filter, a focal shift occurs due to the kind of convex lens effect caused by the difference in the optical path length, whereas, in the present invention, no convex lens effect is produced by the transparent adhesive provided in the circumferential space of the circular ND filter elements or layers (i.e., on the stepped portions between the circular ND filter elements [layers] of different diameters or between the substrate and the lowermost circular ND filter layer).

Therefore, according to an aspect of the present invention, there is provided a concentric ND filter in which multi-layered circular ND filter elements whose diameter is decreased stepwise toward the uppermost layer from the lowermost layer are concentrically provided on a first transparent substrate, wherein a surrounding space of the concentrically multi-layered ND filter elements defined by and between the surface of the transparent substrate and the surface of the central ND filter layer of the smallest diameter is filled with a transparent adhesive.

The concentrically multi-layered circular ND filter elements and the transparent adhesive can be provided between a pair of first and second transparent substrates.

In an alternative, the transparent adhesive can be formed in the surrounding space of the ND filter elements by a spin-coat process.

Taking into account the refractive index of the circular ND filter elements which is usually in the range of 1.3 to 2.6, the refractive index of the transparent adhesive is preferably set to be in the range of 1.3 to 2.6.

The inventors of the present invention also found that the focal shift has been restricted by providing a concave recess whose curvature is such that the convex lens effect can be canceled, on the surface of the transparent substrate opposite to the surface on which the ND filter elements are formed.

Namely, according to another aspect of the present invention, there is provided a concentric ND filter in which multi-layered circular ND filter elements whose diameter is decreased stepwise toward the uppermost layer from the lowermost layer are concentrically provided on one of the opposite surfaces of a transparent substrate, wherein a recess having a concave surface is provided on the other surface of the transparent substrate to cancel a convex lens effect produced by the concentrically multi-layered ND filter elements.

The concave surface can be formed directly on the transparent substrate or can be a hybrid type. To directly form the concave surface on the transparent material, a grinding process can be applied to the glass material and a molding process can be applied to a glass or resin material. In a hybrid type, a concave recess is formed on a transparent layer which is superimposed with a transparent substrate.

According to still another aspect of the present invention, there is provided a concentric ND filter in which multi-layered circular ND filter elements whose diameter is decreased stepwise toward the uppermost layer from the lowermost layer are concentrically provided on one of opposite surfaces of a transparent substrate, wherein the transparent substrate is made of a material whose refractive index "n" is greater than 1.7 (n>1.7); preferably, n is greater than 1.8 (n>1.8). If the transparent substrate is made of a material of high refractive index, a difference in the optical path length between light transmitted only through the transparent substrate and light transmitted through both the transparent substrate and the ND filter elements is reduced and thus, the focal shift can be restricted.

According to yet another aspect of the present invention, in a concentric ND filter in which multi-layered circular ND filter elements whose diameter is decreased stepwise toward the uppermost layer from the lowermost layer are concentrically provided on one of opposite surfaces of a transparent substrate, the refractive index "n" of the transparent substrate and the refractive index "N" of the circular ND filter elements satisfy the following relationship;

$N-n<0.5$ (wherein $N>n$)

If the circular ND filter elements have different refractive indexes, "N" refers to an average refractive index thereof.

With this arrangement, the refractive index "n" of the transparent substrate approximates the refractive index "N" of the ND filter elements. Consequently, a difference in the optical path length between light transmitted only through the transparent substrate and light transmitted through both the transparent substrate and the ND filter elements is reduced in comparison with the case that the refractive index "n" of the transparent substrate is small, and thus, the focal shift can be restricted.

The inventors of the present invention have further found that the focal shift has been restricted by forming a slight recess whose depth is increased toward its center axis on the center portion of the transparent substrate and providing an ND filter member in the slight recess. Namely, it can be considered that in conventional concentric ND filters, the difference in the optical path length reduced to a spatial distance, caused by the multi-layered ND filter elements, provides a kind of convex lens effect, thus resulting in an occurrence of a focal shift. However, in the present invention, the convex lens effect can be attenuated by the ND filter member which is provided in the concave recess formed in the transparent substrate.

To this end, according to an aspect of the present invention, there is provided a concentric ND filter comprising a transparent substrate which is provided on the center portion thereof with a recess whose depth is increased toward the center portion thereof, and an ND filter member provided in the recess.

The recess can have an arched shape in a cross section and a circular shape in a front view. The ND filter member can be composed of a plurality of circular ND filter elements which are concentrically multi-layered. The circular ND filter layers can be each made of a layer having an arched shape in cross section curved along the curvature of the recess or a planar layer which lies in a plane parallel with the surface of the substrate.

The recess can be made of a stepped recess whose depth is increased toward the center portion thereof and which exhibits a pattern of concentric annuluses in a front view. The ND filter member can be made of a plurality of ND filter layers which are concentrically multi-layered, so that each ND filter layer corresponds to each step of the stepped recess.

Preferably, the density of the circular ND filter layers increases as the diameter thereof decreases.

It is also possible to make the ND filter member of a homogeneous ND filter material. Alternatively, the ND filter member can be made of a liquid material. In this alternative, a second transparent substrate is secured to the first transparent substrate to hold the liquid ND filter member between the first and second transparent substrates.

On the hypothesis that no focal shift occurs if there is no change in the layer thickness, as mentioned above, the inventors have conceived that no change in the layer thickness occurs if the ND filter layer (light transmission restriction layer) is made of a single layer which has a pattern of a non-restriction portion in which the light transmission restriction layer is absent and a transmission restriction portion in which the light transmission restriction layer is present, so that the transmittance of the single ND filter layer is increased toward the peripheral portion of the light transmission restriction layer from the center portion thereof at which the transmittance is minimum.

To this end, according to an aspect of the present invention, the transparent substrate is provided thereon a single light transmission restriction layer with a predetermined pattern which includes a transmission restriction portion in which the light transmission restriction layer is present and a non-restriction portion in which the light transmission restriction layer is absent, wherein the surface area ratio of the non-restriction portion to the transmission restriction portion is increased toward the peripheral portion of the light transmission restriction layer from the center portion thereof.

The light transmission restriction layer can be made of a conventional ND filter layer having a constant transmittance or a light interception layer which does not permit light to pass therethrough.

It has been confirmed that no or little undesirable focal shift have occurred in the ND filter provided with the single light transmission restriction layer having a predetermined transmittance distribution as mentioned above.

The ND filter according to the present invention can be advantageously used with a photographing lens having a mechanical stop mechanism which varies the mechanical stop aperture between a fully-open position and the maximum closure of the aperture.

The present disclosure relates to subject matter contained in Japanese Patent Applications No. 09-172177 (filed on Jun. 27, 1997), 09-179515 (filed on Jul. 4, 1997), No. 09-201904 (filed on Jul. 28, 1997), No. 09-201905 (filed on Jul. 28, 1997), and No. 09-271610 (filed on Oct. 3, 1997) which are expressly incorporated herein by reference in their entireties.

BRIEF DESCRIPTION OF THE DRAWINGS

The invention will be discussed below in detail with reference to the accompanying drawings, wherein.

DESCRIPTION OF THE PREFERRED EMBODIMENT

Figure 1:
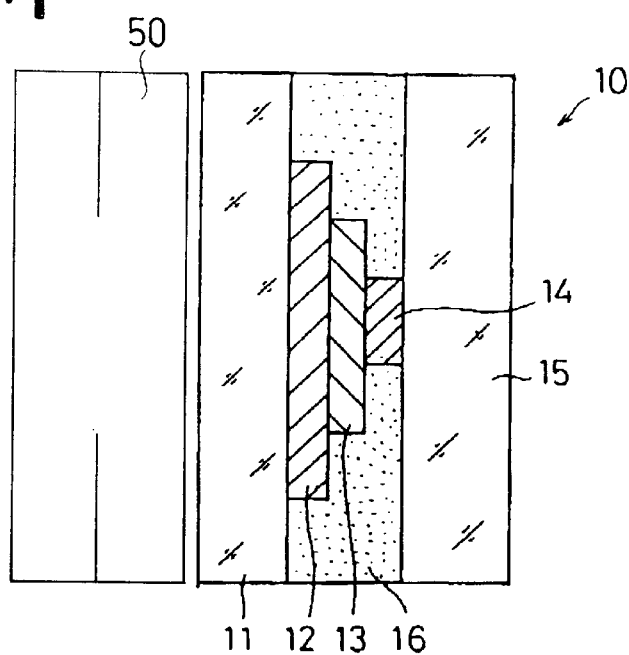
FIG. 1 is a schematic sectional view of a concentric ND filter, taken along the line I—I in FIG. 2, according to an embodiment of the present invention.
Figure 2:
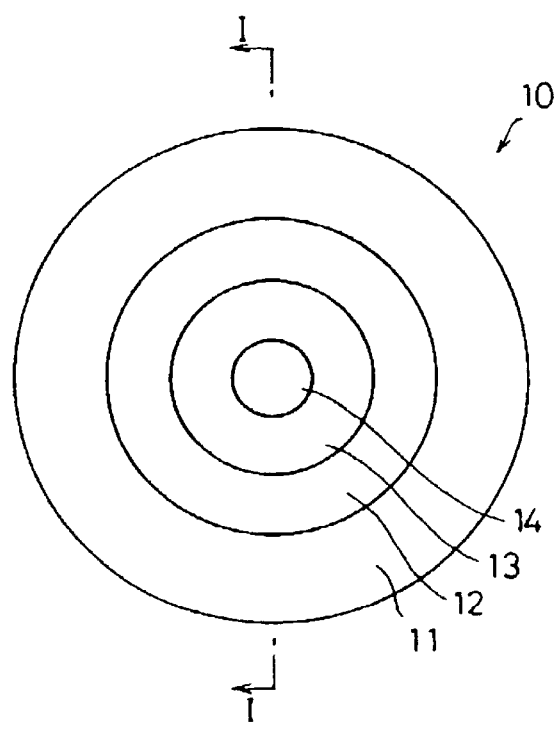
FIG. 2 is a front elevational view of FIG. 1.
Figure 22:
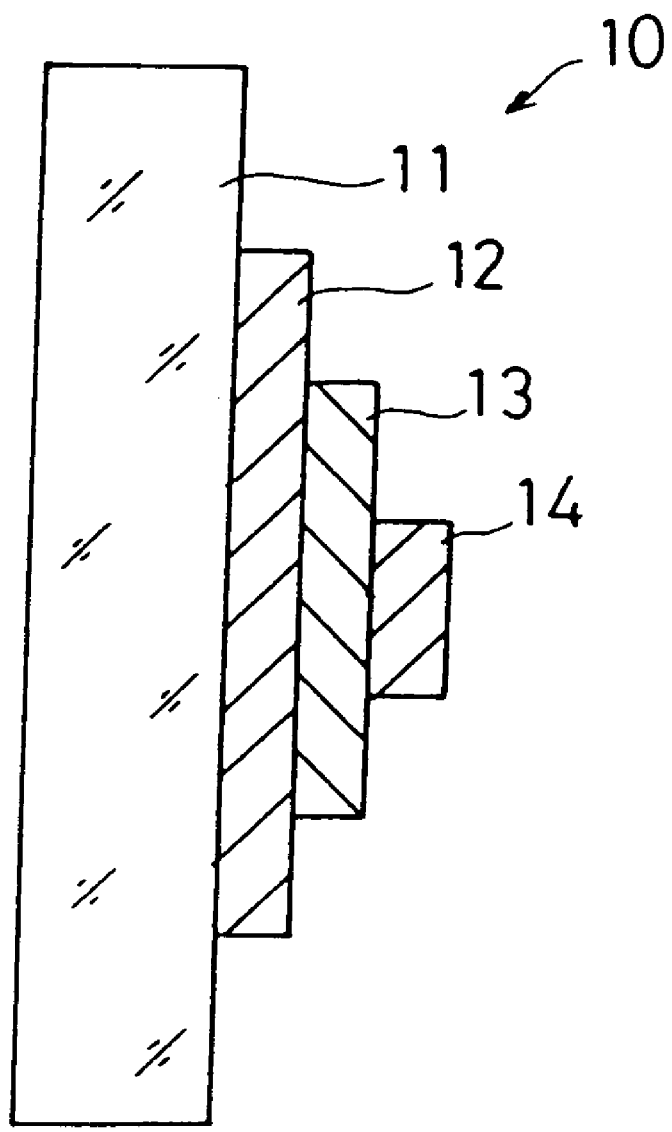
FIG. 22 is a longitudinal sectional view of a known concentric ND filter.

FIGS. 1 and 2 show a first embodiment of a concentric ND filter 10 according to the present invention. The elements corresponding to those in an ND filter shown in FIG. 22 are designated with the same numerals. The ND filter elements (light absorbing layers or films) 12 through 14 are provided between the substrates 11 and 15. A transparent adhesive 16 is provided in the space between the substrates 11 and 15 and surrounding the ND filter elements 12 through 14, i.e., on the stepped portions defined between the circular ND filter elements and the space defined between the substrates 11 and 15. A mechanical stop mechanism 50 which varies the mechanical stop aperture between a fully-open position and the maximum closure of the aperture is provided in a photographing lens together with and in front of the ND filter 10.

Figure 3:
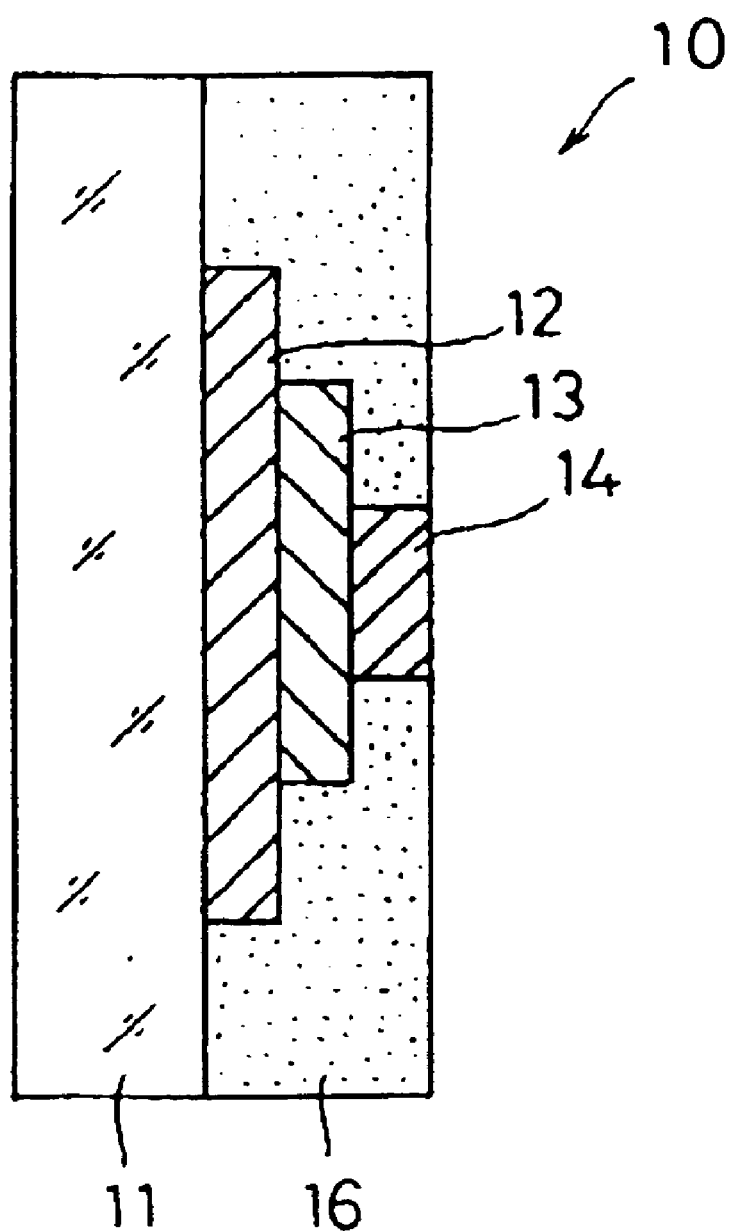
FIG. 3 is a sectional view, similar to FIG. 1, according to another embodiment of the present invention.

FIG. 3 shows another embodiment of the present invention, in which no second transparent substrate 15 is provided. In FIG. 3, a transparent adhesive 16 is provided on the stepped portions defined between the circular ND filter elements (light absorbing layers) 12, 13 and 14 and on the first substrate 11 to surround the ND filter elements. The transparent adhesive 16 can be formed, for example, by a spin-coat process. Namely, the transparent adhesive 16 is dripped onto the center portion of the smallest diameter ND filter element 14 while rotating the substrate 11, so that the transparent adhesive 16 is moved outward due to the centrifugal force onto the stepped portions and the surface of the substrate 11. Thereafter, the transparent adhesive 16 is dried and set.

It is ideal or preferable that the refractive index of the transparent adhesive 16 be identical to the refractive index of the ND filter elements 12 through 14. However, if the refractive index of the transparent adhesive 16 provided on the stepped portions between the ND filter elements and on the substrate is substantially identical to that of the ND filter elements, there is little difference in the optical path length between at the fully-open position of the mechanical stop and at the maximum closure of the aperture. Consequently, no or little convex lens effect mentioned above is caused, thus resulting in a negligible focal shift.

It is hypothesized that the focal shift is caused by the difference in the optical path length between the ND filter elements 12 through 14 in the above discussion. However or in addition to, it can be also considered that the focal shift is caused by an irregular surface or incomplete surface flatness of the evaporated ND filter layers 12 through 14 or an incorrect dimension of the stepped portions between the ND filter layers (i.e., incorrect thickness of the ND filter layers), etc. Even if the inventors' hypothesis is incorrect, the scope of protection by the present invention cannot be influenced since it has been confirmed by experimentation that no or little focal shift has occurred in the concentric ND filter according to the present invention.

Figure 4:
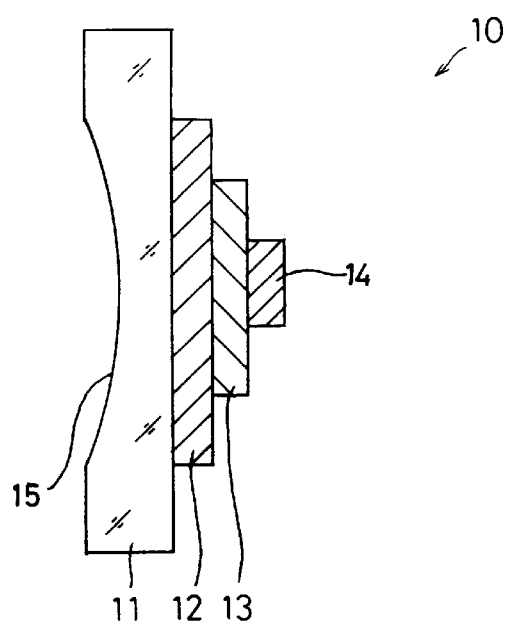
FIG. 4 is a schematic sectional view of a concentric ND filter having a concave surface, taken along the line IV—IV in FIG. 5, according to an embodiment of the present invention.
Figure 5:
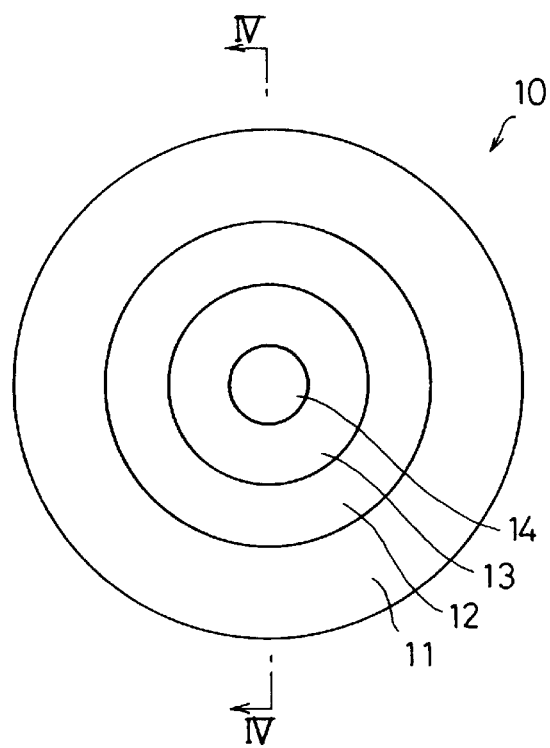
FIG. 5 is a front elevational view of FIG. 4.

FIGS. 4 and 5 show another embodiment of a concentric ND filter according to the present invention. In FIGS. 4 and 5, the elements corresponding to those in FIG. 22 are designated with the same reference numerals. The transparent substrate 11 is provided on one surface thereof with ND filter elements (light absorbing layers) 12 through 14 and on the other surface with a recessed surface (concave surface) 15 whose curvature is such that the convex lens effect caused by the ND filter elements 12 through 14 can be canceled.

The degree of the convex lens effect provided by the ND filter elements 12 through 14 (i.e. the magnitude of the refraction) can be calculated in accordance with the refractive index, diameter, and thickness of the ND filter elements 12 through 14 by ray tracing. The curvature of the concave surface 15 is determined so as to cancel the convex lens effect thus obtained by calculation. The concave surface 15 can be pre-formed, for example, by grinding the transparent substrate 11 made of a glass material or can be molded simultaneously upon molding the transparent substrate 11 of a glass or plastic material.

Figure 6:
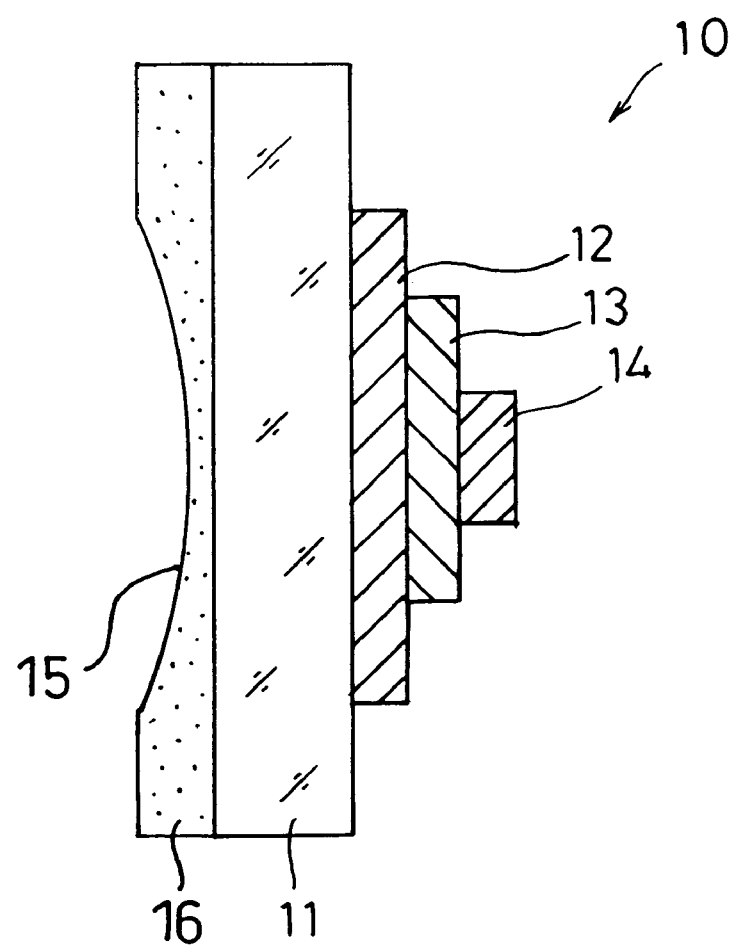
FIG. 6 is a sectional view, similar to FIG. 4, according to another embodiment of the present invention.

FIG. 6 shows a hybrid type ND filter, in which a transparent resin layer 16 having a concave surface 15 is provided on one surface of the substrate 11. In the structure shown in FIG. 6, the concave surface 15 which is provided on the substrate 11 cancels the convex lens effect produced by the ND filter layers 12 through 14. Consequently, the convex lens effect in question is negligible, and hence no or little focal shift occurs.

Figure 7:
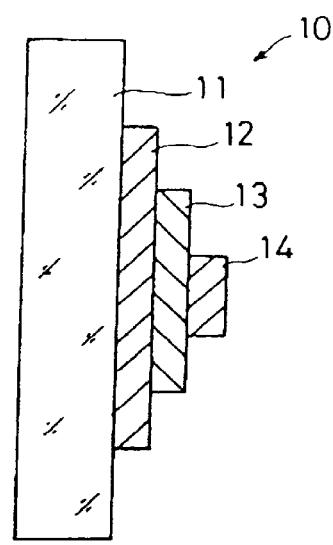
FIG. 7 is a schematic sectional view of a concentric ND filter, taken along the line VII—VII in FIG. 8, according to an embodiment of the present invention.
Figure 8:
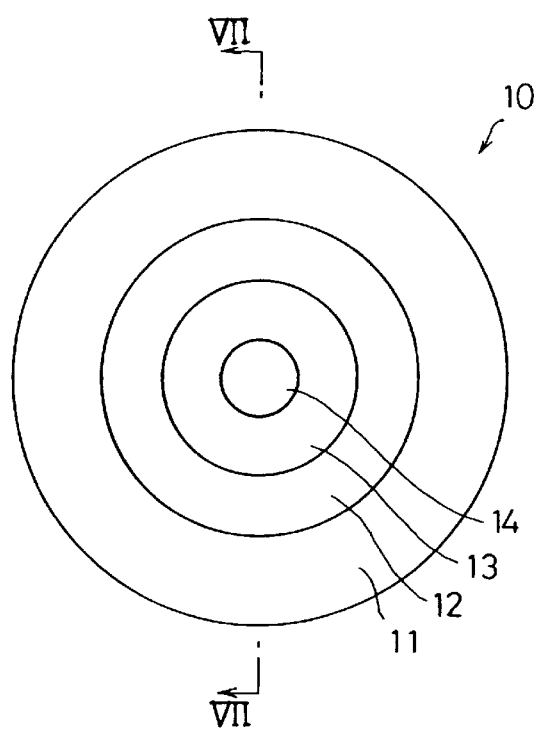
FIG. 8 is a front elevational view of FIG. 7.

In a modified embodiment of the concentric ND filter shown in FIGS. 7 and 8, the shape of the ND filter is identical to that of a concentric ND filter shown in FIG. 22, however, the refractive index "n" of the transparent substrate 11 and the refractive index "N" of the ND filter elements 12 through 14 are set as follows according to the features of the present invention.

Namely, in a first example, the transparent substrate 11 is made of a material whose refractive index "n" is larger than 1.7 (n>1.7). In a second example, the transparent substrate 11 and the ND filter elements 12 through 14 are made of materials whose refractive indexes "n" and "N" satisfy the following relationship;

$(N-n)<0.5$

The reasons that the focal shift is restricted by selecting the refractive indexes "n" and "N" of the transparent substrate 11 and the ND filter elements 12 through 14 so as to satisfy the relationship mentioned above will be discussed below referring to FIG. 9.

Figure 9:
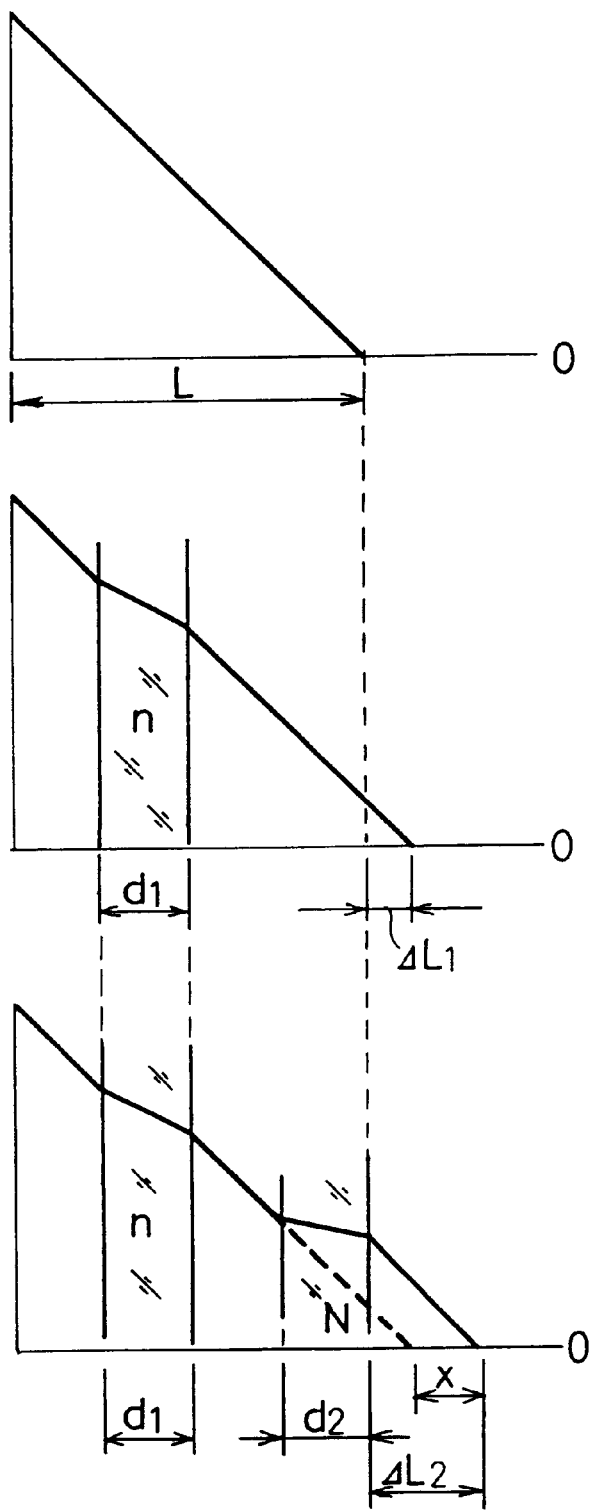
FIG. 9 is an explanatory view to explain how the focal shift can be restricted according to an embodiment of the present invention.

The uppermost figure in FIG. 9 shows a beam of light which passes the optical axis O at a distance of L from a reference position. If an optical element, whose refractive index and thickness are "n" and "d1", respectively is inserted in the optical path, as shown in the middle figure in FIG. 9, the intersection point of the light at the optical axis O is moved from L to (L+ΔL1), wherein the distance ΔL1 is given by;

$$\Delta L1 = (n-1)d1/n$$

In the lowermost figure in FIG. 9, an optical element (thin layer), whose refractive index and thickness are "N" and "d2", respectively, is formed on the optical element whose refractive index and thickness are "n" and "d1", respectively, by vaporization. The distance of the intersection point of the light at the optical axis O is moved from L to (L+ΔL2), wherein the distance ΔL2 is given by;

$$\Delta L2 = \Delta L1 + x$$

wherein x=(N−1)d2/n

To prevent the focal shift, we obtain the following relationship;

$$(L + \Delta L2)/(L + \Delta L1) = (L + \Delta L1 + x)/(L + \Delta L1)$$
$$= 1 + x/(L + \Delta L1)$$
$$= 1.0$$

Namely, $x/(L + \Delta L1) \approx 0$

The thickness d2 is in the order of a few tenths of a micrometer and although x is a small value, it is in practice impossible to make the value of x/(L+ΔL1) equal to zero. For the value of x/(L+ΔL1) to approach as close to zero as possible, in the present embodiment, the value of ΔL1 is increased by simply increasing the value of "n" (first example) or by increasing the value of "n" to approximately the same value as "N" (second example) under the condition that the values of L, d1 and d2 are constant. Thus, the focal shift between the fully-open position of the mechanical stop and the maximum closure of the aperture can be restricted. The above-mentioned advantage can be obtained also by increasing the thickness d1 of the substrate if there is a space big enough to accommodate the ND filter.

Figure 10:
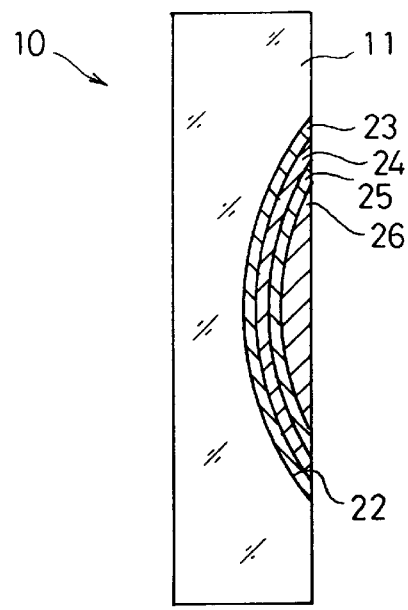
FIG. 10 is a schematic sectional view of a concentric ND filter, taken along the line X—X in FIG. 11, according to the present invention.
Figure 11:
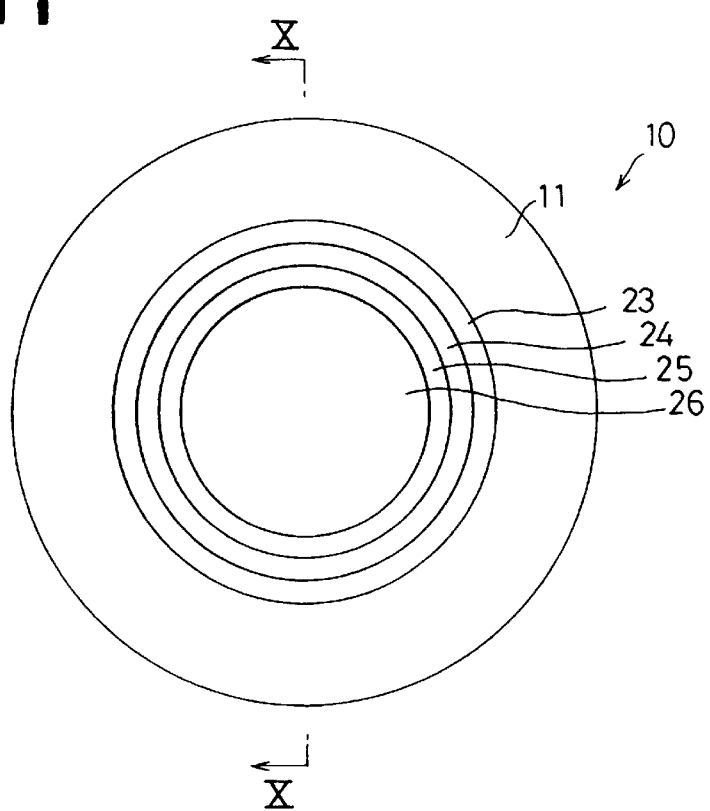
FIG. 11 is a front elevational view of FIG. 10.

FIGS. 10 and 11 show yet another embodiment of the present invention. The transparent circular substrate 11 is provided on the center portion thereof with a circular concave recess 22 (micro concave recess) whose center is located on the optical axis and which is defined by a part of a spherical surface. The concave recess 22 which is defined by a part of a circle in cross section and a circular shape in a front view is provided therein with concentrically arranged and multi-layered circular ND filter elements 23 through 26. The circular ND filter layers 23 through 26 are each defined by a part of a spherical surface along the concave recess 22 in cross section. The outer surface of the innermost (smallest) ND filter layer 26 is flush with the planar surface of the transparent substrate 11. The thickness of the ND filter layers 23 through 26 is in the order of a few tenths of a micrometer, and the depth of the concave recess 22 is determined accordingly. The density of the concentric ND filter elements (layers) 23 through 26 is increased toward the smallest diameter ND filter element 26 from the largest diameter ND filter element 23.

Figure 12:
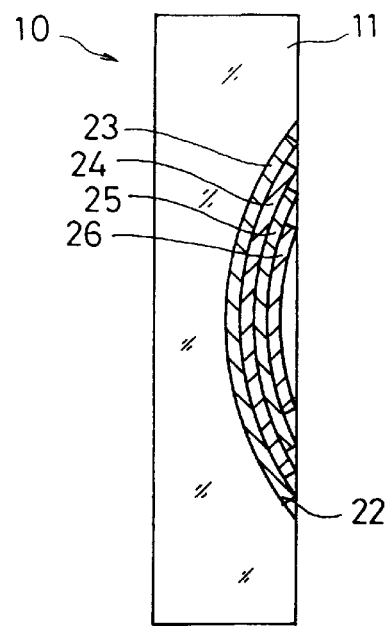
FIG. 12 is a sectional view, similar to FIG. 10, according to another embodiment of the present invention.

In FIG. 12 which shows a modified embodiment of FIGS. 10 and 11, the peripheral edges of the concentric ND filter elements 23 through 26 have stepped discrete ends and the outer surface of the smallest diameter ND filter element 26 is recessed so that the outer surface of the ND filter element 26 is not flush with the surface of the substrate 11, unlike the embodiment shown in FIGS. 10 and 11.

Figure 13:
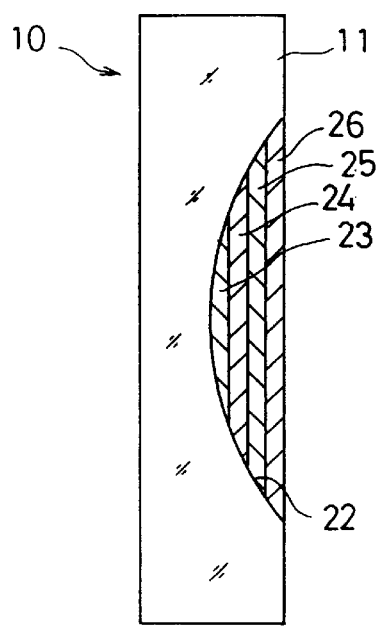
FIG. 13 is a sectional view, similar to FIG. 10, according to another embodiment of the present invention.

In an embodiment shown in FIG. 13, the concentric ND filter elements (layers) 23 through 26 are each made of a planar film which lies in a plane parallel with the surface of the substrate 11.

Figure 14:
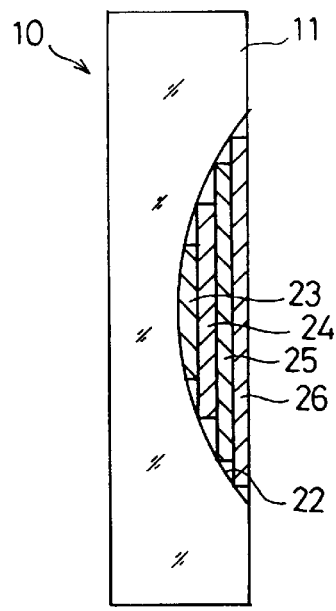
FIG. 14 is a sectional view, similar to FIG. 10, according to another embodiment of the present invention.

In an embodiment shown in FIG. 14, the concentric ND filter elements (layers) 23 through 26 are each made of a planar film which lies in a plane parallel with the surface of the substrate 11, as in the embodiment shown in FIG. 13, however the concentric ND filter elements have stepped ends at the peripheral edges thereof.

Figure 15:
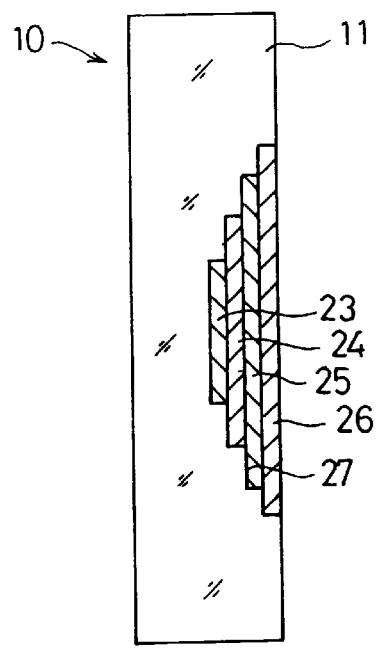
FIG. 15 is a sectional view, similar to FIG. 10, according to another embodiment of the present invention.

In an embodiment shown in FIG. 15, the substrate 11 is provided on its center portion with a stepped recess 27 having a pattern of concentric annuluses in a front elevational view pattern, so that the concentric ND filter elements (layers) 23 through 26 in the form of a planar plate are superimposed one on another stepwise in the stepped recess 27.

Figure 16:
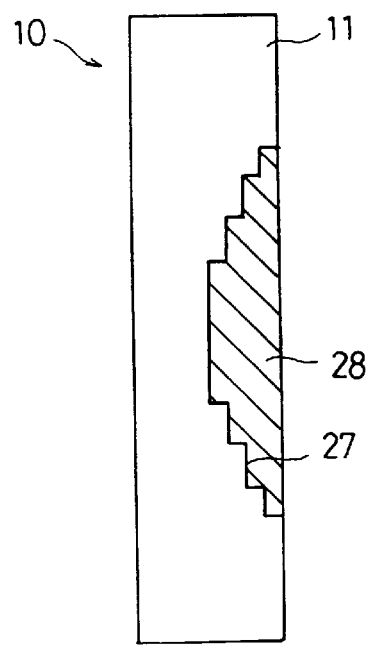
FIG. 16 is a sectional view, similar to FIG. 10, according to another embodiment of the present invention.

In an embodiment shown in FIG. 16, the recess 27 formed in the substrate 11 is filled with a single ND filter material 28. The embodiment shown in FIG. 16 can be applied to the previous embodiments in which the fully-open position 11 is provided with the concave recess 22 in the form of a part of a sphere, as shown in FIG. 10, 12, 13 or 14.

Figure 17:
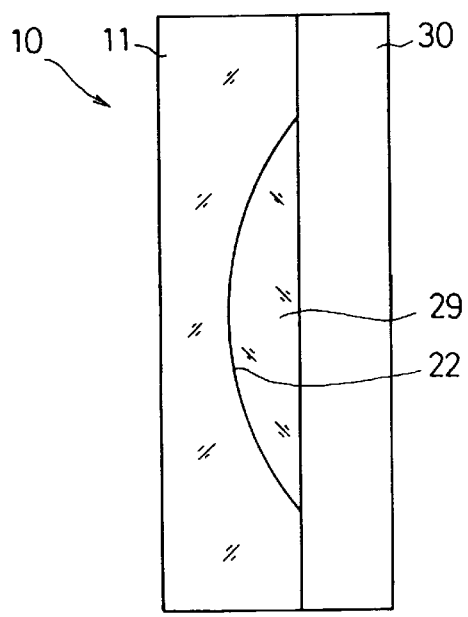
FIG. 17 is a sectional view, similar to FIG. 10, according to another embodiment of the present invention.

FIG. 17 shows another embodiment in which the concave recess 22 of the first substrate 11 in the form of a part of a spherical surface is filled with a liquid material 29 for the ND filter element and thereafter, a second substrate 30 is adhered to the surface of the first substrate 11 to enclose the liquid material 29 in the concave recess 22. This embodiment can be applied to the previous embodiments shown in FIG. 15 or 16 in which the substrate 11 is provided with the stepped recess 27.

In the embodiments illustrated in FIGS. 10 through 17, since the substrate 11 is provided with the concave recess 22 defined by a part of a spherical surface or the stepped recess 27, in which the ND filter material is provided, there is no or little difference in the reduced distance between the central portion and the peripheral portion of the ND filter. Thus, the concave lens effect in question can be restricted and hence, no or little focal shift occurs.

Figure 18:
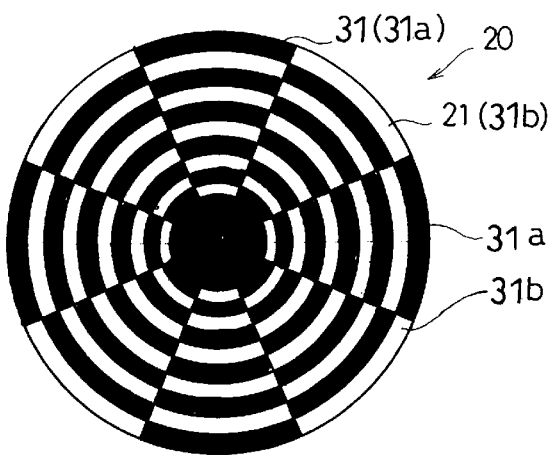
FIG. 18 is a plan view of a pattern of a transmission restriction layer of an ND filter by way of example, according to an embodiment of the present invention.
Figure 19:
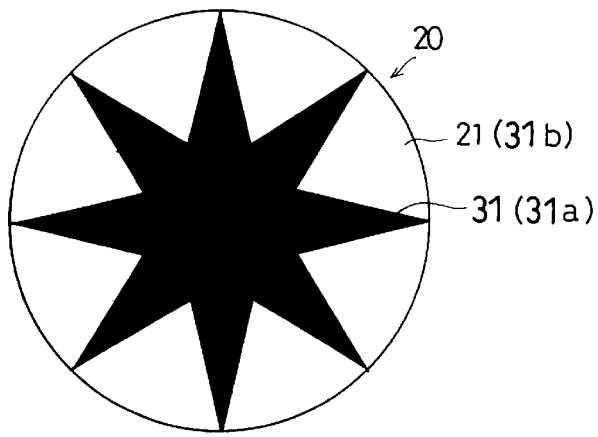
FIG. 19 is a plan view of a pattern of a transmission restriction layer of an ND filter by way of example, according to an embodiment of the present invention.
Figure 20:
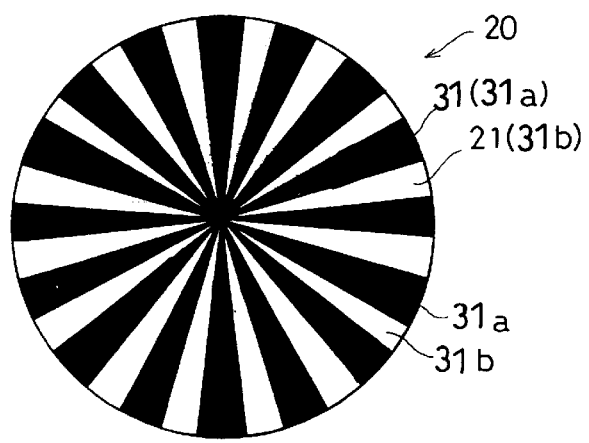
FIG. 20 is a plan view of a pattern of a transmission restriction layer of an ND filter by way of example, according to an embodiment of the present invention.

FIGS. 18 through 20 show different embodiments of the ND filter 20 according to the present invention. FIGS. 18 through 20 show three different front elevational shapes of a single ND filter layer (light transmission restriction layer) 31 formed on a transparent substrate 21. The ND filter layer 31 is provided with filter portions (wherein a filter layer exists) 31a indicated by black segments and non-filter portions 31b (transparent portions) indicated by white segments. The filter portions 31a of the ND filter layer 31 have a uniform transmittance (e.g., 2%). The center portion of the ND filter layer 31 including the optical axis is entirely defined by the filter portion 31a and the surface area ratio of the non-filter portions 31b to the filter portions 31a is increased toward the periphery of the ND filter.

For instance, 100% of the center portion is a filter portion 31a and the surface area of the filter portion 31a is reduced and the surface area of the non-filter portion 31b is increased toward the peripheral edge of the ND filter layer 31. At the outermost peripheral edge portion of the ND filter layer 31, the surface area of the filter portion 31a or the surface area of the non-filter portion 31b can be, for example, in the range of 50–0% and 50–100%, respectively. The surface area ratio can be varied either continuously or discretely. Thus, the transmittance of the entire ND filter 20 is minimum at the center portion and increases toward the peripheral portion.

Figure 21:
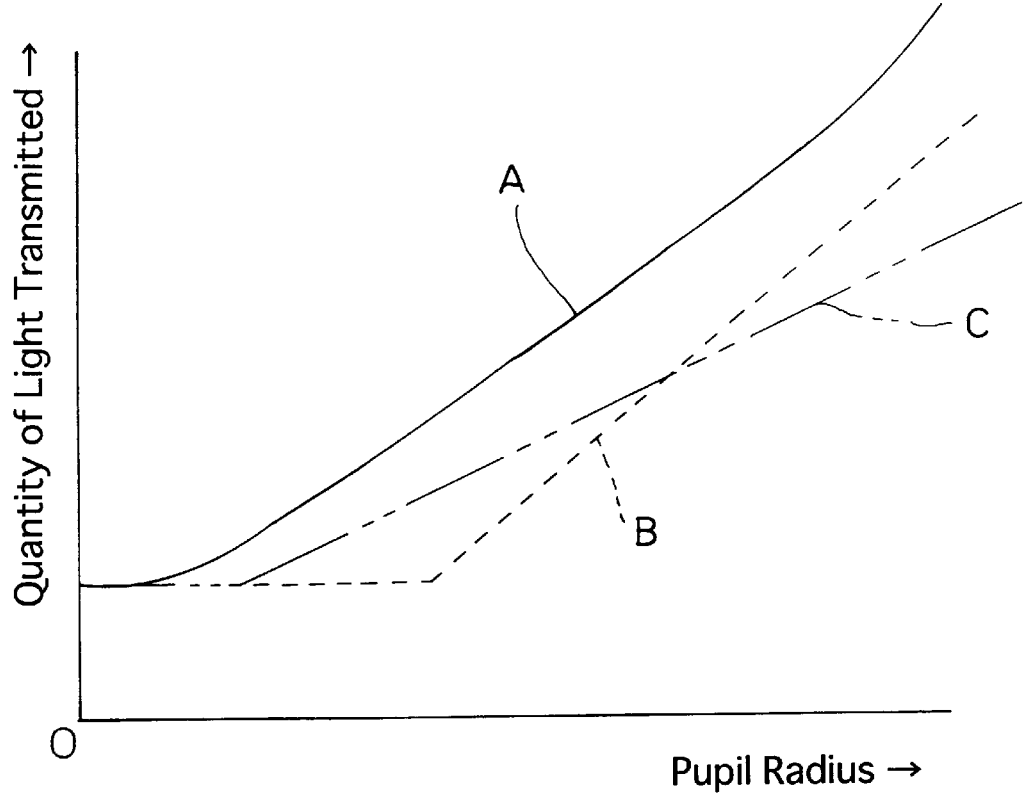
FIG. 21 is a graph showing a light transmission curve obtained by an ND filter according to an embodiment of the present invention.

FIG. 21 shows a graph showing examples of a transmittance distribution of the ND filter 20 having the ND filter layer 31 as mentioned above. The transmittance curve indicated by a solid line "A" can be obtained, for example, by the ND filter layer 31 shown in FIG. 18; the transmittance curve indicated by a dotted line "B" can be obtained, for example, by the ND filter layer 31 shown in FIG. 19; and the transmittance curve indicated by a two-dotted and chain line "C" can be obtained, for example, by the ND filter layer 31 shown in FIG. 20, respectively. Note that the transmittance curves shown in FIG. 21 do not exactly correspond to the filter patterns of the transmission restriction layer 31 shown in FIGS. 18 through 20.

The filter pattern of the transmission restriction layer 31 is not limited to those shown in FIGS. 18 through 20. Any patterns in which the surface area ratio of the filter portion 31a to the non-filter portion 31b increases from the center portion toward the peripheral edge portion can be used. For instance, a hole-pattern can be used to obtain the same change in the surface area ratio between the filter portion and the non-filter portion as above.

Moreover, although the filter portion 31a of the ND filter layer 31 has a uniform transmittance (e.g., 2%), as mentioned above, it is possible to replace the filter portion 31a with a light interception layer (film) which does not permit light to pass therethrough. In this replacement, the ND filter 20 is provided, even on the center portion thereof, with a predetermined pattern of a light interception portion in which the light interception layer is present and a light transmissive portion in which the light interception layer is absent. The surface area ratio between the light interception portion and the light transmissive portion varies from the center portion toward the peripheral portion of the ND filter.

The ND filter layer or the light interception layer, which constitutes the light transmission restriction layer is made of a single layer. Therefore, the ND filter 20 can be produced by a single vaporization process using a mask which has openings (windows) corresponding to the portion in which no light transmission restriction layer is present. Furthermore, since no positional deviation of the mask occurs unlike the case where a plurality of masks are employed to prepare a plurality of multi-layered ND filter elements, the manufacturing operation of the ND filter can be simplified.

What is claimed is:

1. A concentric ND filter in which multi-layered circular ND filter elements whose diameter is decreased stepwise toward the uppermost layer from the lowermost layer are concentrically provided on a first transparent substrate, wherein a surrounding space of concentrically multi-layered ND filter elements defined by and between the surface of said first transparent substrate and the surface of the central ND filter layer of the smallest diameter is filled with a transparent adhesive.

2. A concentric ND filter according to claim 1, further comprising a second transparent substrate so that said concentrically multi-layered circular ND filter elements and said transparent adhesive are provided between said first and said second transparent substrates.

3. A concentric ND filter according to claim 1, wherein said transparent adhesive is formed in the surrounding space of said ND filter elements by a spin-coat process.

4. A concentric ND filter according to claim 1, wherein the refractive index of said circular ND filter elements and the refractive index of said transparent adhesive are in the range of 1.3 to 2.6.

5. A concentric ND filter according to claim 1, used with a mechanical stop mechanism which varies a mechanical stop aperture between a fully-open position and the maximum closure of the aperture.

6. A concentric ND filter in which multi-layered circular ND filter elements whose diameter is decreased stepwise toward the uppermost layer from the lowermost layer are concentrically provided on one of opposite surfaces of a transparent substrate, wherein a recess having a concave surface is provided on the other surface of said transparent substrate to cancel a convex lens effect produced by the concentrically multi-layered ND filter elements.

7. A concentric ND filter according to claim 6, wherein said transparent substrate is a glass material and wherein said concave surface of said recess is ground on the glass material.

8. A concentric ND filter according to claim 6, wherein the transparent substrate is molded out of glass or out of a resin material, wherein said recess is formed upon molding the transparent substrate.

9. A concentric ND filter according to claim 6, wherein said transparent substrate is provided with a transparent resin layer with a concave recess, said transparent resin layer being superimposed on said transparent substrate.

10. A concentric ND filter according to claim 6, used with a mechanical stop mechanism which varies a mechanical stop aperture between a fully-open position and the maximum closure of the aperture.

11. A concentric ND filter in which multi-layered circular ND filter elements whose diameter is decreased stepwise toward the uppermost layer from the lowermost layer are concentrically provided on one of opposite surfaces of a transparent substrate, wherein said transparent substrate is made of a material whose refractive index "n" is greater than 1.7 (n>1.7).

12. A concentric ND filter according to claim 11, used with a mechanical stop mechanism which varies a mechanical stop aperture between a fully-open position and the maximum closure of the aperture.

13. A concentric ND filter in which multi-layered circular ND filter elements whose diameter is decreased stepwise toward the uppermost layer from the lowermost layer are concentrically provided on one of opposite surfaces of a transparent substrate, wherein the refractive index "n" of said transparent substrate and the refractive index "N" of said circular ND filter elements satisfy the following relationship;

$$N-n<0.5.$$

14. A concentric ND filter according to claim 13, used with a mechanical stop mechanism which varies a mechanical stop aperture between a fully-open position and the maximum closure of the aperture.

* * * * *